United States Patent [19]
Murphy

[11] 3,931,370
[45] Jan. 6, 1976

[54] DOUBLE FUNNEL WITH BAFFLE CASCADE AERATION UNIT

[75] Inventor: Declan S. Murphy, Valois, Canada

[73] Assignee: Atara Corporation, Canada

[22] Filed: Jan. 10, 1975

[21] Appl. No.: 540,235

[30] Foreign Application Priority Data
Jan. 10, 1974  Canada ............................. 189883

[52] U.S. Cl. ............... 261/77; 261/123; 261/124; 210/220
[51] Int. Cl.² .. C02C 1/06; C02B 3/08; B01D 47/02
[58] Field of Search ....... 261/77, 123, 124; 210/220

[56] References Cited
UNITED STATES PATENTS

| | | | |
|---|---|---|---|
| 2,289,953 | 7/1942 | Aldridge | 261/77 |
| 2,353,195 | 7/1944 | Sims | 261/77 |
| 3,452,966 | 7/1969 | Smolski | 261/77 |
| 3,722,679 | 3/1973 | Logue | 261/77 |
| 3,817,500 | 6/1974 | Cooper | 261/77 |

FOREIGN PATENTS OR APPLICATIONS

| | | | |
|---|---|---|---|
| 14,473 | 1912 | United Kingdom | 261/77 |

*Primary Examiner*—Tim R. Miles
*Assistant Examiner*—Gregory N. Clements
*Attorney, Agent, or Firm*—Craig & Antonelli

[57] ABSTRACT

Cascade Aeration mixing guns for oxygenating sewage are known in the art but cannot be properly scaled up, or paralleled in one unit. A double cascaded unit which incorporates integral baffles is shown so that capacity can be greatly increased, while maintaining efficiency.

5 Claims, 4 Drawing Figures

DOUBLE FUNNEL WITH BAFFLE CASCADE AERATION UNIT

This invention relates to aerators of the double funnel cascade type, as described in Canadian Pat. No. 937,610 issued on Dec. 4, 1973 in the name of Jan W. Romanowski.

To reduce capital costs in any installation it is generally desirable to increase the size and reduce the numbers of aerators. Unfortunately the size of the aerator - the 12 inch diameter tube - of the above mentioned patent represents a good typical compromise of maximum aeration capacity and maximum aeration efficiency, on oxygen transfer. These quantities are to some extent interdependent, and tests show that both depend upon the depth of submersion. The abbreviated table below is an extract based on test results for such a 12 inch diameter unit.

|  |  | Values of Liquid Depth | | | |
|---|---|---|---|---|---|
|  |  | 10' | 12' | 16' | 20' |
| Free Air Flow SCFM | 12 | 1.52 | 1.76 | 2.98 | 2.57 |
|  | 16 | 1.94 | 2.23 | 2.78 | 3.29 |
|  | 20 | 2.33 | 2.69 | 3.33 | 3.94 |
|  | 24 | 2.47 | 2.85 | 3.54 | 4.19 |
|  | 28 | 2.55 | 2.94 | 3.65 | 4.31 |

Figures in the table are oxygen transfer rates in lbs. per hour.

Attempts to increase the throughput by scaling up the unit are very unsatisfactory. Superficially, to double the capacity would seem, erroneously, merely to require doubling all areas - a size increase from 12 diameter to 18 inches ought to give ample margin. In practice this does not happen and the momentum of the increased air jet is such that proper mixing does not take place; doubling the depth helps somewhat, but the efficiency is still low; moreover, as increased excavation is expensive, doubling depth is a theoretical laboratory type suggestion rather than a practical expedient. Attempts at making twin parallel cascade funnels within a single tube gives disappointing results also.

Accordingly, this invention comprises an assembly adapted to aerate sewage comprising: oxygen-containing gas supply means having two delivery orifices to form two streams of gas; two first funnels converging downstream and secured downstream from and cooperating with said orifices so that oxygen-containing gas issuing from the orifice can entrain liquid and become mixed therewith; two second funnels converging downstream and spaced downstream from the first funnels; baffle means in the flow path between the exit from the first funnels and to the second funnels; means securing the first funnels, the baffle means and the second funnel together so that the mixture of oxygen-containing gas and sewage streaming from the exit of the first funnels impinges on the baffle means before entering the second funnels.

The invention will best be understood by reference to the drawings which illustrate by way of example a unit incorporating the invention.

IN THE DRAWINGS

Figure 1:
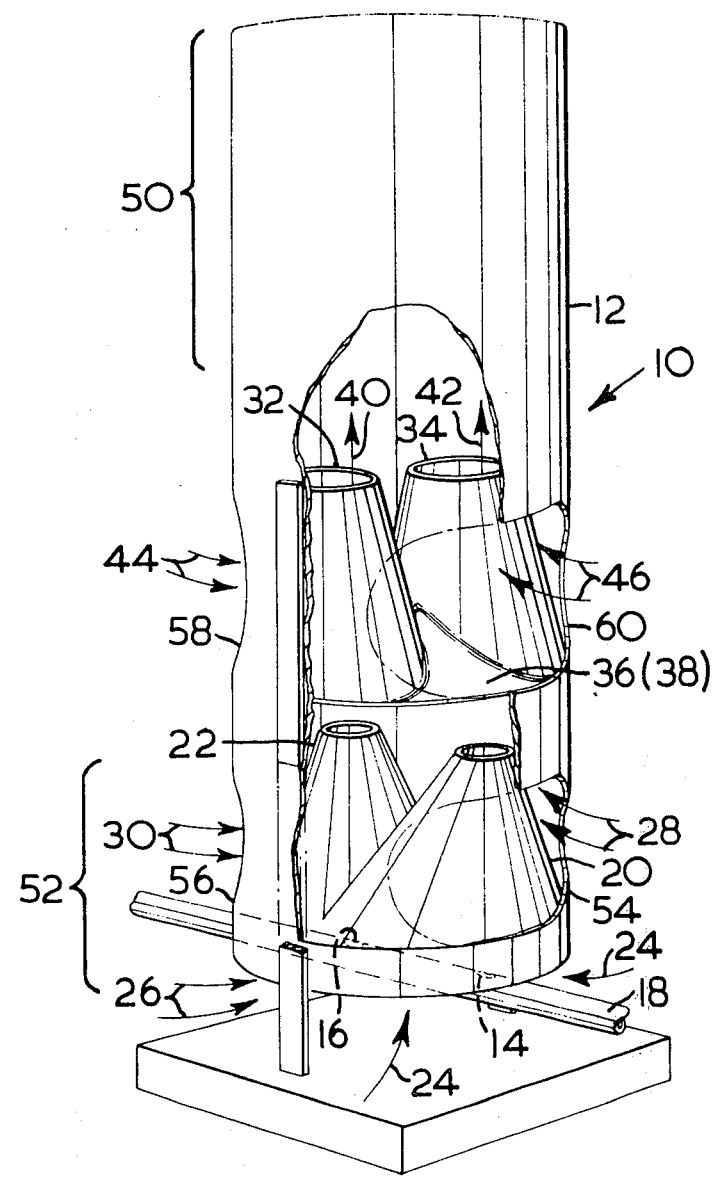
FIG. 1 is a perspective view of a double cascade aerator unit.

As can be seen from FIG. 1 the aerator unit 10 comprises an outer tube 12. Two orifices 14, 16, in feed pipe 18 which is connected to an oxygen or compressed air supply (not shown) form upward air jets. These jets are directed into upwardly convergent first funnels 20, 22 and entrain streams of liquid 24, 26. After emerging from funnels 20, 22 the streams of gas liquid mixture induce further liquid streams 28, 30 and are dispersed in them. The second funnels 32, 34 are orthogonally arranged with respect to funnels 20, 22 and are joined together by skirts 36, 38 so that the streams of sewage and oxygen-containing gas leaving the first funnels 20, 22 impinge on these skirts and are directed into funnels 32, 34. Thereafter, the streams 40, 42 leaving funnels 32, 34 induce further streams of liquid 44, 46 in the tube 12. This tube has an exit portion 50 and a support portion 52 to provide convenient mounting for all four funnels with cutouts 54, 56, 58, 60 to allow access of sewage to the interior.

Figure 2B:
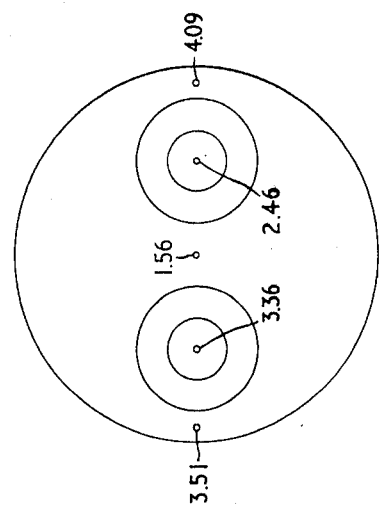
FIGS. 2a and 2b illustrate a comparison flow pattern as between an aerator of FIG. 1 and a twin cascade aerator which might be considered as a logical extension of prior art.
Figure 2A:
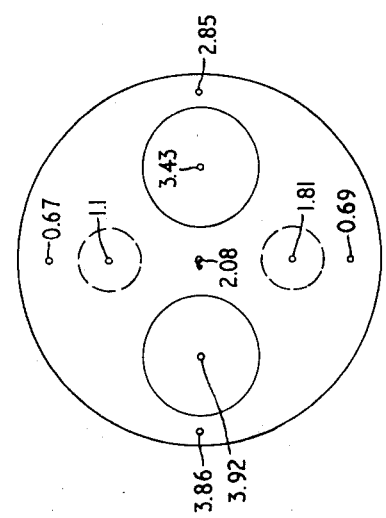

The advantages of impinging the streams leaving first funnels 20, 22 on skirts 36, 38 instead of directing them within second funnels 32, 34 will be understood more clearly by referring to FIGS. 2a which shows measurements of liquid velocity in feet per second at various points across the profile for the type of aerator shown in FIG. 1, and 2b which shows similar measurements for a unit modified so that funnels 20, 32 are coaxial, as are funnels 22 and 34.

These measurements were taken with a 4 foot long, 18 inch diameter tube immersed in liquid of a depth of 8 feet, 4 inches, measurements being taken at a section about three quarters of the way up the tube; i.e. in the exit portion. The liquid was water from Montreal city supply but with the oxygen content reduced by adding 11.5 milligrams of sodium sulphite ($Na_2SO_3$) per milligram of dissolved oxygen as supplied. The velocity profiles shown were measured by a velometer, air supply being 20 cubic feet per minute.

It can be seen that the flow pattern in FIG. 2a occurs in two maxima corresponding to the center of the second funnel, and that flow in the center is over half the maximum. However, when the two funnels are coaxial it will be seen that the maxima occur at the edges between the exit from the second funnels and the tube, and flow at the center is lower, both relatively and absolutely. It is deduced that the high speed core effect mentioned in Canadian Pat. No. 937,610 is to some extent present but the cores appear, due to the eccentricity of two orifices, to be stable and to cling to the tube at adjacent the axis.

This tentative explanation is in the nature of a visualization of the observed facts and the embodiment described is not bound by the accuracy, or inadequacy, of the explanation. However, what will be understood is that while the axes of the two sets of funnels need not be orthogonal there must be some type of a baffle to prevent through flow between the first and second funnels of each set. It will also be understood, in the light of the above-mentioned patent that dimensions are not critical in the embodiment of FIG. 1, the first funnels tapering from 6 inches diameter at 2½ inches from the lower rim to 3 inches diameter at 11 inches therefrom, at the outlet on a 9 inch pitch circle. The second funnels are really the bifurcated continuation of an inner taper, which starts 14½ inches above the lower rim from a baffle directly above the first funnels at a height of 19 inches above the base. The second funnel outlets are 25½ inches above the lower rim and are 6 inches diameter on a 9 inch pitch circle. The whole unit is preferably made from polyester reinforced with glass fiber fabric. The unit used in FIG. 2b was, of course, dimensionally similar to those given above except that the second two funnels were rotated through 90° about the central axis of the unit so that both pairs were coaxial.

Figure 3:
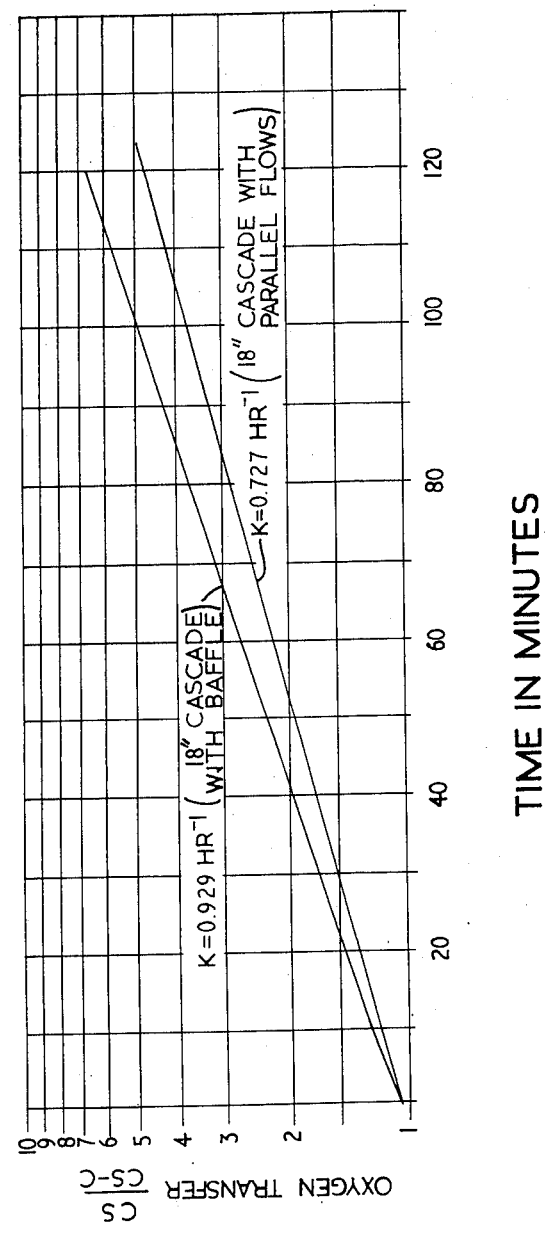
FIG. 3 illustrates graphically the relative oxygen transfer efficiencies for these two types of aerators.

The results indicated by profile flow were cross-checked by actual measurements of dissolved oxygen at a point about 8 feet away from the aerator which was at the center of a 10 foot by 26½ foot basin containing 60,000 litres as shown at FIG. 3. The ordinate shows a non-dimensional oxygen absorption rate plotted logarithmically against a linear abscissa of time in minutes. The non-dimensional ordinate is derived from measured values according to the formula $C_s/C_s - C_L$ where $C_s$ is the saturation of oxygen and $C_L$ is the concentration measured at a given time. The value of dissolved oxygen of the samples was determined by a Beckman pH-meter furnished with an enlarged scale, a gold cathode and silver anode; and the readings thus obtained were cross-checked by chemical titration of the dissolved oxygen.

It will be understood that the test figures shown are for comparison as between the twin unit with and without the intercascade baffle. The twin unit design throughput is about 40 scfm free air flow although it will maintain acceptable oxygen transfer efficiency when overloaded to as high as 70 scfm, just as the single (12 inch diameter) unit has a design throughput of 20 scfm, but may be used as high as 30 scfm. These figures are given for a typical lagoon depth of 15 feet, and little relative difference will be found for greater or less depths.

At low air flow rates the new twin unit does not quite achieve the oxygen transfer of the single unit but it will be clear from an inspection of the table given above that increasing the air flow rate by 4 scfm would transfer little more oxygen except in deep pools. However, the table below for the 18 inch diameter unit shows that the transfer rate declines only little for higher throughputs and that it is almost as efficient as two 12 inch diameter single units.

|  | Values of Liquid Depth | | | |
|  | 10' | 12' | 16' | 20' |
| --- | --- | --- | --- | --- |
| 20.0 | 2.15 | 2.48 | 3.07 | 3.63 |
| Free Air Flow SCFM 40.0 | 3.90 | 4.50 | 5.58 | 6.60 |
| 50.0 | 4.78 | 5.51 | 6.83 | 8.09 |
| 68.8 | 5.43 | 6.27 | 7.75 | 9.17 |

While there has been shown and described what is at present considered the preferred embodiment of the invention, it will be obvious to those skilled in the art that various changes and modifications may be made therein without departing from the invention as defined by the appended claims.

The embodiments of the invention in which an exclusive property or privilege is claimed are defined as follows:

1. An assembly adapted to aerate sewage comprising:
   oxygen-containing gas supply means having two delivery orifices to form two streams of gas;
   two first funnels converging downstream and secured downstream from and cooperating with said orifices so that oxygen-containing gas issuing from the orifice can entrain liquid and become mixed therewith;
   two second funnels converging downstream and spaced downstream from the first funnels;
   baffle means in the flow path between the exit from the first funnels and the entry to the second funnels; and
   means securing the first funnels, the baffle means and the second funnels together so that the mixture of oxygen-containing gas and sewage streaming from the exit of the first funnels impinges on the baffle means before entering the second funnels.

2. An assembly as claimed in claim 1 wherein the baffle means comprises
   a skirt joining the two second funnels together.

3. An assembly as claimed in claim 1 wherein said securing means comprises a tube extending both upstream and downstream from said second funnels, said tube having cutouts both upstream and downstream of the inlet to the two second funnels, whereby the upstream openings allow access of unmixed liquid sewage to the inlet of the two second funnels, together with the mixture issuing from the two first funnels, and the downstream openings allow access of further unmixed sewage whereby the downstream extending portion forms an exit tube in which further mixing occurs.

4. An assembly as claimed in claim 3 wherein the tube has a minimum diameter of at least 18 inches.

5. An assembly as claimed in claim 2 wherein each of the two second funnels are asymmetrically flared at the upstream end so as to blend into the skirts and form a circular section therewith.

* * * * *